United States Patent [19]

Lieser et al.

[11] 4,442,071
[45] Apr. 10, 1984

[54] EXTRACTION OF PLUTONIUM IONS FROM AQUEOUS SULFURIC ACID SOLUTIONS WITH $D_2$EHPA OR $D_2$EHPA/TOPO

[75] Inventors: Karl H. Lieser, Seeheim-Jugenheim; Bernd Stojanik, Rodgau, both of Fed. Rep. of Germany

[73] Assignee: Kernforschungszentrum Karlsruhe GmbH, Karlsruhe, Fed. Rep. of Germany

[21] Appl. No.: 286,168

[22] Filed: Jul. 23, 1981

[30] Foreign Application Priority Data

Jul. 24, 1980 [DE] Fed. Rep. of Germany ....... 3028024

[51] Int. Cl.$^3$ ............................................. C01G 43/00
[52] U.S. Cl. ...................................... 423/10; 423/251; 252/627; 252/631
[58] Field of Search ............... 423/10, 251; 252/631, 252/627

[56] References Cited

U.S. PATENT DOCUMENTS

| | | | |
|---|---|---|---|
| 2,859,094 | 11/1958 | Schmitt et al. | 423/10 |
| 2,924,506 | 2/1960 | Anderson et al. | 423/10 |
| 3,288,568 | 11/1966 | Tomijima et al. | 423/9 |
| 3,343,925 | 9/1967 | Bathellier | 423/10 |
| 3,387,945 | 6/1968 | Boudry et al. | 423/10 |

FOREIGN PATENT DOCUMENTS 10394  4/1980  European Pat. Off. ............. 423/10

OTHER PUBLICATIONS

Horner, D. E. and C. F. Coleman *Plutonium Extraction from Nitrate and Sulfate Solutions by Amines and Organophosphorus Compounds*, ORNL-3051, 1961.

Horner, D. E. and C. F. Coleman *Recovery of Uranium and Plutonium from Sulfuric Acid Decladding Solutions*, ORNL-2830, 1959.

*Primary Examiner*—Deborah L. Kyle
*Assistant Examiner*—Matthew A. Thexton
*Attorney, Agent, or Firm*—Spencer & Frank

[57] ABSTRACT

Method for separating plutonium ions from an aqueous solution containing sulfuric acid. The method comprises introducing into the aqueous solution 0.1 to 1.5 moles of nitrate ions per liter of aqueous solution. To the aqueous solution containing nitrate ions, there is added an organic phase comprising a solution of 0.1 to 1.0 M di-2-ethylhexylphosphoric acid in kerosene in a volume ratio of the aqueous solution containing nitrate ions to the organic phase of between 1:1 and 4:1 to extract the plutonium ions into the organic phase. The organic phase containing plutonium ions is then separated from the aqueous solution. A re-extractant aqueous solution containing 0.2 to 1.0 M oxalic acid, and 0 to 0.5 M nitric acid is then added to the separated organic phase to re-extract the plutonium ions into the re-extractant aqueous solution. The re-extractant aqueous solution containing plutonium ions is then separated from the organic phase.

9 Claims, No Drawings

EXTRACTION OF PLUTONIUM IONS FROM AQUEOUS SULFURIC ACID SOLUTIONS WITH D2EHPA OR D2EHPA/TOPO

BACKGROUND OF THE INVENTION

The present invention relates to a method for separating plutonium ions from aqueous solutions containing sulfuric acid, in which plutonium is initially transferred, by liquid-liquid extraction with an organo-phosphoric acid ester in an organic solvent, from an aqueous phase to an organic phase, and then re-extracted with an aqueous salt solution.

Plutonium containing sulfate solutions are obtained during the treatment of plutonium-containing combustible wastes with sulfuric acid, in, for example, the so-called acid digestion process. Plutonium-containing sulfuric acid solutions may also be encountered in the processing or reprocessing of nuclear fuels. The separation and isolation of plutonium from such solutions is an important task within the framework of nuclear technology because plutonium constitutes a valuable nuclear fuel and because plutonium may also contribute to a significant increase in the risk potential in connection with the final storage of wastes. The ability to quantitatively separate plutonium is therefore desirable. The known, industrially utilized processes for separation of plutonium, such as extraction from nitric acid solutions in the Purex process, cannot be used with sulfuric acid solutions since the behavior of plutonium in the extraction process is different in the presence of sulfate ions.

There are references in the literature which discuss reagents that have been used in the direct extractive separation of plutonium from sulfate solutions. Use of such reagents is discussed in D. E. Horner, C. F. Coleman, USAEC Report, ORNL-2830 (1959); D. E. Horner, C. F. Coleman, USAEC Report, ORNL-3051 (1961); and A. Zolotov, M. K. Shmutova, P. N. Palei, J. Anal Chem. USSR 21, 1079 (1966). Examples of the reagents which have been discussed in the literature are primary amines, such as Primene JM-T, a commercially available homologue mixture of primary amines with highly branched alkyl groups having an average of about 20 carbon atoms, made by Rohm & Haas, 1-phenyl-3-methyl-4-benzoyl-pyrazolone-5 (PMBP), trioctylphosphine oxide (TOPO) and di-2-ethylhexylphosphoric acid (D2EHPA). In the reported experiments, the plutonium content of the solutions to be extracted was between 2 and 20 mg Pu per liter. In all of the reported experiments, the oxidation state (IV) of plutonium was stabilized by the addition of 0.05 to 0.5 M sodium nitrite. The sequence of the ease of extractability for the various valencies of the plutonium was the same for all of the extraction agents that were examined, and was $Pu^{IV} > Pu^{VI} \geq Pu^{III} > Pu^{V}$.

The primary amine Primene JM-T, dissolved in Amsco 125-82, a commercially available hydrocarbon diluent mixture, was examined most intensively, with a view towards the possibilities for industrial utilization. With this amine, extraction coefficients of 8000 or more were realized with $H_2SO_4$ concentrations from 0.5 to 2.5 M. The extraction coefficients decreased with increasing acid concentration, and were highest with the presence of 2 M $(NH_4)_2SO_4$ in 0.5 M $H_2SO_4$. To prevent the formation of a third phase, the extraction agent was modified with a long chain alcohol.

By re-extraction of the plutonium from the organic phase with 2 to 5 M $HNO_3$, a product solution was obtained which contained, depending on the amine concentration and on the extracted metal sulfate complexes, considerable quantities of sulfate ions. However, as noted above, the presence of sulfate ions makes the product solution not suitable for further processing in the Purex process. Reductive re-extraction is impossible. Moreover, the extraction agent, which now contains nitric acid, must be purified, since nitric acid interferes with the extraction of plutonium.

In the Zolotov et al reference, a 0.1 M PMBP solution in benzene was used to exract Pu(IV) from solutions containing 0.5 to 3.5 M $H_2SO_4$ with extraction coefficients (D) equal to 35 to 85. An increase in the acid concentration resulted in a poorer extraction.

The re-extraction took place with 7.5 M $H_2SO_4$ or with a 10 M HCl solution. In neither case, however, could the resulting solution be used in the Purex process. It has also been found possible to re-extract the plutonium by twice contacting the organic phase with a saturated oxalic acid solution.

When TOPO dissolved in Amsco 125-82 was used as the extraction agent, the extraction coefficients for Pu(IV) in 3 to 5 M $H_2SO_4$ were between 20 and 30. The addition of sodium sulfate caused a worsening of the extraction of Pu(IV), and the addition of sodium nitrate, to a final concentration of 1 to 2 M, had no influence on the extraction coefficient.

In the re-extraction from 0.3 M TOPO with a 1 M $Na_2CO_3$ solution, re-extraction coefficients of more than 1000 were realized. However, the re-extraction solution contained sulfate ions, since 1 mole of sulfate ions per 2 moles of TOPO reached the organic phase.

The lowest extraction coefficients for Pu(IV) were realized with D2EHPA dissolved in Amsco 125-82, as the extraction agent. For an extraction from a solution containing 3 to 5 M $H_2SO_4$, the coefficient was between 4 and 10. In the presence of 0.5 M $Na_2SO_4$ in 3 M $H_2SO_4$, the extraction coefficient increased to 50.

Re-extraction of Pu(IV) with 8 to 10 M $HNO_3$ or ferrous sulfamate was possible only if the D2EHPA concentration was less than 0.01 M. If a 0.01 M D2EHPA solution was contacted with 0.1 to 1.0 M oxalic acid solution, re-extraction coefficients of 100 to 2000 resulted. Another effective re-extraction medium was a 1 M $Na_2CO_3$ solution. Depending on the plutonium content of the organic phase (20 mg to 1.1 g Pu), the resulting re-extraction coefficients were between 20 and 80.

In order to avoid the formation of a third phase due to the presence of the sodium salt of the dialkyl phosphoric acid, it was necessary, in an alkali re-extraction, to modify the organic phase by the addition of long chain alcohols, alkyl phosphates, alkyl phosphonates or alkyl phosphine oxides. With the addition of tributyl phosphate (TBP) the extraction worsened, and TOPO had only a slight effect on the extraction coefficient. A synergistic effect was noted with a mixture of 0.1 M TOPO and 0.4 M D2EHPA only for the extraction of Pu(IV). Thus, the addition of 0.1 M TOPO to 0.4 M D2EHPA increased the extraction coefficient from 0.4 to 5.

In view of the desired further processing of the product solution as a nitric acid solution in the Purex process it was impossible, in the prior art, to use Primene JM-T. The same applied to TOPO for the extraction of gram quantities of plutonium. Moreover, PMBP is a special reagent and, in view of its limited availability on the market and its present high cost, it is of no economic interest. The use of PMBP, TOPO and D2EHPA according to the prior art methods, however, require multi-stage separating processes in order to realize sufficiently high separation factors.

SUMMARY OF THE INVENTION

It is an object of the present invention to provide a method for separating plutonium ions from an aqueous solution containing sulfuric acid which avoids the disadvantages of prior art processes, and which yields a plutonium-containing aqueous solution which is free from sulfate, and which, with minimal further processing, can be introduced into the Purex process.

It is another object of the present invention to provide a method for extracting plutonium ions which provides a significant increase in the extraction coefficients to $10^3$ or more, so that a one-time or two-time application of the extraction process will yield a substantially quantitative separation of plutonium.

It is a further object of the present invention to provide a method for extracting plutonium ions in which the extraction agent can be reused without purification.

To achieve these objects, and in accordance with its purpose, the present invention provides a method for separating plutonium ions from an aqueous solution containing sulfuric acid, comprising:

(a) introducing into the aqueous solution 0.1 to 1.5 moles of nitrate ions per liter of aqueous solution;

(b) adding to the aqueous solution containing nitrate ions, an organic phase comprising a solution of 0.1 to 1.0 M di-2-ethylhexylphosphoric acid in kerosene, in an amount sufficient that the volume ratio of the aqueous solution containing nitrate ions to the organic phase is 1:1 to 4:1, to extract the plutonium ions into the organic phase;

(c) separating the organic phase containing plutonium ions from the aqueous solution;

(d) adding to the separated organic phase a re-extractant aqueous solution containing 0.2 to 1.0 M oxalic acid and 0 to 0.5 M nitric acid, to re-extract the plutonium ions into the re-extractant aqueous solution; and (e) separating the re-extractant aqueous solution containing plutonium ions from the organic phase.

Alternatively, the organic phase which is added to the aqueous solution containing nitrate ions may comprise 0.01 to 0.1 M trioctylphosphine oxide, in addition to the 0.1 to 1.0 M di-2-ethylhexylphosphoric acid. In such a case, the above described oxalic acid-containing solution will not be used for the re-extraction. Instead, an aqueous solution containing 1.0 to 2.0 M carbonate ions will be used to re-extract the plutonium ions from the organic phase.

In contrast to the prior art process, it has been found that in the present method, a significant increase of the extraction coefficient—to $2 \times 10^3$ to $2 \times 10^4$—can be realized by the addition of solid sodium nitrate to the aqueous phase. Thus, a one or two-stage extraction, utilizing the process according to the invention, is sufficient to substantially quantitatively separate the plutonium.

It has further been found that the step of setting the oxidation state of the plutonium to (IV) by the addition of further reagents, such as sodium nitrite, can be omitted.

Finally, the re-extraction with, for example, diluted oxalic acid solution or 1 M $Na_2CO_3$ solution, yields a sulfate-free product solution which, after destruction of the oxalate ions or acidification of the carbonate solution with $HNO_3$, can be introduced directly into the Purex process. Due to the high extraction coefficient, the process of the present invention can be implemented in a simple apparatus. The possibility of directly reusing the extraction agent without prior purification is a further advantage of this process.

It is understood that both the foregoing general description and the following detailed description are exemplary, but are not restrictive of the invention.

DETAILED DESCRIPTION OF THE INVENTION

In the process of the present invention, nitrate ions are initially added to an aqueous solution containing plutonium ions and sulfuric acid. A sufficient amount of nitrate ions will be added to obtain a concentration of 0.1 to 1.5 moles of $NO_3^-$ per liter of solution. Suitable nitrates that can be added include sodium nitrate. Potassium- and ammonium nitrate will also be suitable. Nitric acid is not suitable. The nitrates have not to be added necessarily as solids.

The aqueous solution is then subjected to a liquid-liquid extraction with an organic solution containing 0.1 to 1.0 M di-2-ethylhexylphosphoric acid, in kerosene, which results in the extraction of the plutonium ions into the organic phase. The ratio of the aqueous phase to organic phase should be 1:1 to 4:1.

In an extraction of plutonium ions from a solution containing 1 to 2 M $H_2SO_4$ and a total of 1 to 2.5 M sulfate ions (pH<1), and to which nitrate has been added before the extraction with D2EHPA in an organic solvent, distribution coefficients greater than $10^3$ have been realized depending on the concentration conditions. By extracting this sulfuric acid solution twice with the D2EHPA solution, a quantitative separation of the plutonium can be obtained and a decontamination factor of more than $10^6$ can be realized. The sulfuric acid solution is thus freed completely from plutonium. The decontamination factor is defined as the ratio of the initial plutonium concentration in the aqueous solution to the plutonium concentration of the aqueous solution after the extraction (raffinate concentration).

Americium, which may also be present, is also extracted, depending on the operating conditions, to a substantially lesser degree than plutonium, so that its concentration can be reduced by this process. Sulfuric acid, however, is not extracted in this process, so that the extracted plutonium is free from sulfuric acid.

Thereafter, the plutonium ions are re-extracted from the organic phase with an aqueous 0.2–1.0 M oxalic acid solution. Depending on the concentration conditions, the resulting re-extraction coefficients can be up to an order of magnitude of $10^3$. In the re-extraction, the plutonium is obtained as an oxalate. The re-extraction can also be effected with a mixture of 0.2 to 1 M oxalic acid and up to 0.5 M nitric acid, preferably, at an increased temperature, which enhances the precipitation of the oxalate.

The preferred temperature range lies between 40° C. to 70° C. The nitric acid added to the aqueous oxalic acid should preferably have a final concentration of 0.1 to 0.3 M.

If a more complete separation of plutonium from the organic phase is desired, the re-extraction step may be repeated.

After the re-extraction, the organic solution may be returned for re-use in the extraction stage of the process with no processing or purification required.

The plutonium oxalate is then filtered out of the re-extraction solution. The resultant plutonium oxalate may be calcined into plutonium dioxide in a known manner, or may be dissolved by the addition of nitric acid, with the oxalate ions destroyed by the addition of potassium permanganate. Subsequently, the nitric acid solution can be further processed according to a known method, such as the Purex process.

The solution obtained as a filtrate during filtration of the plutonium oxalate from the re-extraction solution contains oxalic acid, and can be re-used in the re-extraction process.

Under certain conditions, the danger of formation of a third phase exists during re-extraction.

If the solution used for the re-extraction has a pH value higher than 5, the salt formation of the di-2-ethyl-hexylphosphoric acid starts. The resulting salt is insoluble in both liquid phases and forms a third phase, if it is not complexed by an organic modifier.

In a preferred embodiment of the invention, the formation of a third phase can be avoided by the addition of 0.01 to 0.1 M trioctylphosphine oxide (TOPO) to the organic extraction solution of 0.1 to 1.0 M D2EHPA in kerosene. Depending on the concentration conditions, the extraction coefficients realized are then greater than $10^4$. A two-time extraction with the D2EHPA-TOPO solution to improve separation of plutonium, provides a decontamination factor greater than $10^8$.

When a D2EHPA-TOPO organic phase is used as the extraction solution, americium, which may also be present, is also extracted, depending on the operating conditions, to a significantly lesser degree than plutonium, so that its concentration may also be reduced in this manner of implementing the process. As in the case when D2EHPA is used alone in the process of the present invention, use of D2EHPA-TOPO organic phase results in a process in which no sulfuric acid is extracted with the plutonium.

When employing the D2EHPA-TOPO extraction, the plutonium is re-extracted from the organic phase with an aqueous 1.0–2.0 M carbonate solution rather than an oxalate solution. Suitable carbonate solutions that can be used include ammonium carbonate solutions, sodium- or potassium carbonate solutions. Depending on the process conditions, the resulting re-extraction coefficients are in the order of magnitude of $10^2$. Two stage re-extraction in order to improve yield is also possible. The organic phase may be returned to the extraction step without further processing or purification. The aqueous phase may be further processed by adding nitric acid and then further processing according to a prior art process, such as the Purex process. Alternatively, the plutonium may be precipitated as $(NH_4)_4 PuO_2(CO_3)_3$ after oxidation of the plutonium to plutonium (VI). This oxidation may be effected electrolytically or with an oxidizing agent.

A suitable oxidizing agent is nitric acid. By heating up and concentrating the Pu-containing nitric acid solution at 120° C., the Pu IV is oxidized to Pu VI. After the "thermal" oxidation the Pu VI nitrate concentrate is diluted with dilute nitric acid. If the separation of the plutonium in this form is desired it is advisable to effect the re-extraction with an ammonium carbonate solution. By selectively oxidizing the plutonium, the quantitative separation of americium is again made possible.

The following examples are given by way of illustration to further explain the principles of the invention. These examples are merely illustrative and are not to be understood as limiting the scope and underlying principles of the invention in any way. All percentages referred to herein are by weight unless otherwise indicated.

EXAMPLE 1

10 ml of a starting solution containing 4 g/l Pu(IV), 1.2 M $H_2SO_4$, a total of 1.6 M sulfate ions, 3.5 g/l Al(III), 1 g/l Fe(III), 6 g/l Zn(II), and further cations and anions in lesser concentrations, were mixed with enough solid $NaNO_3$ to make the starting solution 1.5 M in $NO_3^-$ and were then extracted for five minutes with 5 ml of 0.4 M D2EHPA in kerosene. The extraction coefficient for plutonium was greater than $2 \times 10^3$. The resulting organic phase was separated and divided into two portions for re-extraction. One portion was re-extracted with 2 ml of 0.5 M oxalic acid solution for 30 minutes. The re-extraction coefficient was 33. The other portion of the organic phase was extracted with 5 ml of a 1 M oxalic acid solution for 30 minutes. This method resulted in a re-extraction coefficient of 500.

The organic phase was reused without purification for the extraction of a further charge of the starting solution.

The aqueous phase from the 1 M oxalic acid extraction was filtered out on a glass frit. In this process, 96% of the plutonium was separated as plutonium oxalate, and 4% of the re-extracted plutonium remained dissolved in the oxalic acid solution. The plutonium-containing oxalic acid solution was used for the re-extraction of a further charge of the organic phase by the method using 1 M oxalic acid. The solid plutonium oxalate was mixed with 1 ml concentrated $HNO_3$ and then with 3 ml 0.1 N potassium permanganate solution, in order to dissolve the oxalate and destroy the oxalate ions. The resulting solution met the requirements to be used as a feeder solution in the Purex process.

EXAMPLE 2

10 ml of the same starting solution used in Example 1 were mixed, as in Example 1, with $NaNO_3$ and were extracted for 5 minutes with 5 ml of an 0.4 M D2EHPA solution in kerosene. This extraction solution additionally contained 0.07 M trioctylphosphine oxide. The distribution coefficient for plutonium was greater than $10^4$.

The organic phase obtained in this manner was separated and re-extracted for 30 minutes with 2.5 ml of a 2 M ammonium carbonate solution. The re-extraction coefficient for the plutonium was 200.

The resulting aqueous phase was divided and processed in two ways.

The first portion of the plutonium-containing ammonium carbonate solution was mixed with 2.5 ml of 8 M $HNO_3$. This resulted in an approximately 4 M $HNO_3$ solution which contained 8 g Pu per liter and could be used for further processing in the Purex process.

The second portion of the aqueous solution was mixed with 5 ml of a 2 M ammonium carbonate solution, which was saturated in hypochlorite, and was heated to 50° C. for one hour. More than 99% of the plutonium was precipitated as ammonium plutonyl tricarbonate and was filtered out.

It will be understood that the above description of the present invention is susceptible to various modifications, changes and adaptations, and the same are intended to be comprehended within the meaning and range of equivalents of the appended claims.

What is claimed is:

1. Method for separating plutonium ions from an aqueous solution containing sulfuric acid, comprising:
    (a) introducing into the aqueous solution 0.1 to 1.5 moles of nitrate ions per liter of aqueous solution;
    (b) adding to the aqueous solution containing nitrate ions, an organic phase comprising a solution of 0.1 to 1.0 M di-2-ethylhexylphosphoric acid in kerosene in an amount sufficient that the volume ratio of the aqueous solution containing nitrate ions to the organic phase is between 1:1 and 4:1, to extract the plutonium ions into the organic phase;
    (c) separating the organic phase containing plutonium ions from the aqueous solution;
    (d) adding to the separated organic phase, a re-extractant aqueous solution containing 0.2 to 1.0 M oxalic acid, and 0 to 0.5 M nitric acid, to re-extract the plutonium ions into the re-extractant aqueous solution; and
    (e) separating the re-extractant aqueous solution containing plutonium ions from the organic phase.

2. A method according to claim 1, wherein the aqueous solution contains 1 to 2 M $H_2SO_4$ and a total of 1 to 2.5 M sulfate ions.

3. Method for separating plutonium ions from an aqueous solution containing sulfuric acid, comprising:
    (a) introducing into the aqueous solution 0.1 to 1.5 moles of nitrate ions per liter of aqueous solution;
    (b) adding to the aqueous solution containing nitrate ions, an organic phase comprising a solution of 0.1 to 1.0 M di-2-ethylhexylphosphoric acid and 0.01 to 0.1 M trioctylphosphine oxide in kerosene in an amount sufficient that the volume ratio of the aqueous solution containing nitrate ions to the organic phase is between 1:1 and 4:1, to extract the plutonium ions into the organic phase;
    (c) separating the organic phase containing plutonium ions from the aqueous solution;
    (d) adding to the separated organic phase, a re-extractant aqueous solution containing 1.0 to 2.0 M carbonate ions, to re-extract the plutonium ions into the re-extractant aqueous solution; and
    (e) separating the re-extractant aqueous solution containing plutonium ions from the organic phase.

4. A method according to claim 3, wherein the aqueous solution contains 1 to 2 M $H_2SO_4$ and a total of 1 to 2.5 M sulfate ions.

5. A method according to claim 1 or 3, wherein the plutonium ions in the re-extractant aqueous solution are subjected to further processing.

6. A method according to claim 1 or 3, wherein the organic phase, subsequent to the extraction of plutonium ions therefrom, is reused without purification for extracting plutonium ions.

7. A method according to claim 1 or 3, wherein the aqueous solution containing nitrate ions, is extracted twice with the organic phase.

8. A method according to claim 1 or 3, wherein the separated organic phase is extracted twice with the re-extractant aqueous solution.

9. A method according to claim 1 or 3, wherein said nitrate ions are introduced by adding sodium nitrate.

* * * * *